(12) United States Patent
Kimura

(10) Patent No.: US 7,778,138 B2
(45) Date of Patent: Aug. 17, 2010

(54) OBJECTIVE OPTICAL ELEMENT FOR OPTICAL PICKUP DEVICE, OPTICAL ELEMENT FOR OPTICAL PICKUP DEVICE, OBJECTIVE OPTICAL ELEMENT UNIT FOR OPTICAL PICKUP DEVICE AND OPTICAL PICKUP DEVICE

(75) Inventor: Tohru Kimura, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 469 days.

(21) Appl. No.: 11/918,659

(22) PCT Filed: Apr. 14, 2006

(86) PCT No.: PCT/JP2006/307901

§ 371 (c)(1),
(2), (4) Date: Oct. 17, 2007

(87) PCT Pub. No.: WO2006/115081

PCT Pub. Date: Nov. 2, 2006

(65) Prior Publication Data

US 2009/0028033 A1    Jan. 29, 2009

(30) Foreign Application Priority Data

Apr. 22, 2005   (JP)   ............... 2005-153072

(51) Int. Cl.
*G11B 7/00*   (2006.01)
(52) U.S. Cl. ................................. 369/112.03
(58) Field of Classification Search .............. 369/112.1, 369/112.01, 112.03, 112.12, 112.15; 359/569, 359/566, 571, 574
See application file for complete search history.

(56) References Cited

U.S. PATENT DOCUMENTS 6,859,319 B2 *   2/2005   Hayashi ...................... 359/571

FOREIGN PATENT DOCUMENTS

JP   2002-298422   10/2002

\* cited by examiner

*Primary Examiner*—Nabil Z Hindi
(74) *Attorney, Agent, or Firm*—Finnegan, Henderson, Farabow, Garrett & Dunner, L.L.P.

(57) ABSTRACT

An optical element for optical pickup device is provided with an optical path difference providing structure which provides a substantial phase change to a light flux having a predefined wavelength. The optical path difference providing structure is provided with a step portion having a smaller step difference than the predefined wavelength in an optical axis direction.

23 Claims, 9 Drawing Sheets

OBJECTIVE OPTICAL ELEMENT FOR OPTICAL PICKUP DEVICE, OPTICAL ELEMENT FOR OPTICAL PICKUP DEVICE, OBJECTIVE OPTICAL ELEMENT UNIT FOR OPTICAL PICKUP DEVICE AND OPTICAL PICKUP DEVICE

TECHNICAL FIELD

The present invention relates to an objective optical element for an optical pickup device, an optical element for an optical pickup device, an objective optical element unit for an optical pickup device and an optical pickup device, and in particular, to an optical pickup device capable of recording and/or reproducing information by using a light flux emitted from each of plural light sources each having a different wavelength of light source, for an optical information recording medium of a different type, an objective optical element used for the optical pickup device and an objective optical element unit for the optical pickup device.

BACKGROUND ART

In recent years, in an optical pickup device, there is an advanced tendency toward a shorter wavelength of a laser light source that is used as a light source for reproducing of information recorded on an optical disc and for recording of information on an optical disc. For example, a laser light source with a wavelength of 405 nm such as a violet semiconductor laser or a violet SHG laser conducting wavelength conversion of an infrared semiconductor laser by utilizing generation of second harmonic is coming into practical use.

When these violet laser light sources are used, information of 15-20 GB can be recorded on an optical disc having a diameter of 12 cm in the optical pickup device that uses an objective lens whose numerical aperture (NA) is the same as that of DVD (digital versatile disc), and information of 23-25 GB can be recorded on an optical disc having a diameter of 12 cm in the optical pickup device wherein NA of an objective lens has been enhanced to 0.85. In the present specification, hereafter, an optical disc employing a violet laser light source and a magnetic disc are called "a high density disc" generically.

Incidentally, a value of a product of an optical disc player and/or a recorder is not sufficient, if they can conduct recording and/or reproducing of information properly for this high density optical disc alone. If the present realities that DVD and CD (compact disc) on which various types of information are recorded are available on the market, mere recording and/or reproducing of information is carried out on a high density disc is not sufficient, and an optical disc player and/or a recorder having enhanced product value makes it possible to conduct recording and/or reproducing of information properly in the same way even for DVD and CD owned by a user. From the background of this kind, an optical pickup device installed in an optical disc player and/or a recorder is requested to have capability to record and/or reproduce information properly while keeping interchangeability even for any of three types of optical discs including high density optical disc, DVD and CD.

As a method to realize recording and/or reproducing of information properly while keeping compatibility even for any of a high density optical disc and DVD, further for any of a high density optical disc, DVD and CD, there is considered an object that switches selectively between an optical system for the high density optical disc and an optical system for DVD and CD. However, this object requires a plurality of optical systems, which is disadvantageous for downsizing and causes cost increase.

Therefore, for simplifying the structure of an optical pickup device and for achieving cost reduction, it is preferable to standardize an optical system for a high density optical disc and an optical system for DVD and CD as far as possible to reduce the number of optical parts constituting the optical pickup device as far as possible. Further, standardization of objective optical systems arranged to face optical discs is most advantageous for simplification of the structure of the optical pickup device and for cost reduction.

However, when trying to realize compatibility by using common objective optical elements in the optical pickup device, some contraptions or other are needed for forming a light-converged spot corrected properly in terms of aberration on an information recording surface of an optical disc, because each of a wavelength of a light source and a protective substrate thickness used for each optical disc is different.

As an embodiment for aberration correction, it is considered to change a divergence degree of a light flux that enters an objective optical element. In the embodiment for aberration correction of this kind, off-axis characteristics are worsened (the greater the divergence degree is, the greater the coma generated in the case of lens shift in tracking is) depending on the divergence degree of a light flux entering an objective optical element, which is undesirable and a problem.

Another embodiment for aberration correction is to provide a diffractive structure that gives diffraction effects on an optical surface of an objective optical element (for example, see Patent Document 1).

In the aforesaid conventional technologies, it is possible to correct spherical aberrations properly for all light fluxes having respectively two different wavelengths. However, it is difficult to correct spherical aberrations properly for all light fluxes having respectively three different wavelengths.

In the more specific explanation for the foregoing, wavelengths of light fluxes used respectively for a high density optical disc, DVD and CD are represented respectively by $\lambda 1$ that is about 400 nm, $\lambda 2$ that is about 655 nm and $\lambda 3$ that is about 785 nm, resulting in $\lambda 1:\lambda 3 \approx 1:2$. Therefore, in the blaze-shaped diffractive structure such as that described in Patent Document 1, a ratio of diffraction order that offers the greatest diffraction efficiency results in $\lambda 1:\lambda 3 = 2:1$ (for example, when $\lambda 1$ is in $6^{th}$ order, $\lambda 3$ is in $3^{rd}$ order). Further, when the ratio of diffraction order of light fluxes for wavelengths $\lambda 1$ and $\lambda 3$ is 2:1, a value of $\lambda 1 \times 2 - \lambda 3 \times 1$ gets smaller, because an effect of the diffraction is determined by a difference of wavelength x diffraction order and by a pitch of a diffractive ring-shaped zones. Accordingly, when a diffractive structure is designed with a blaze wavelength to be a value close to a multiple of an even number of wavelength $\lambda 1$, for example, mutual diffraction effects for a light flux with a wavelength $\lambda 1$ and a light flux with a wavelength $\lambda 3$ get smaller, and it becomes difficult to conduct recording and/or reproducing of information respectively by using the same objective optical element for a high density optical disc and CD.

On the other hand, even when a difference of wavelength x diffraction order is small, it is possible to achieve compatibility theoretically by using small diffraction effects. In this case, however, a pitch of a diffractive ring-shaped zones needs to be small, which causes various problems that an amount of light is reduced, manufacturing of lenses becomes difficult and aberrations are greatly generated by wavelength fluctuation within a microscopic range of about several nanometers caused by fluctuation of output of a laser light source.

Further, in the conventional technology of this kind, there still is a problem that an efficiency of using light is poor, even in the case where two optional different wavelengths are used respectively for light fluxes entering objective optical elements. For example, when a diffractive structure is used, and an optical path difference is given so that a substantial phase change may be given to only one of plural light fluxes each having a different wavelength, to generate diffraction of diffracted light of +$n^{th}$ order and diffraction of diffracted light of −$n^{th}$ order from the light flux with another wavelength that has passed through the aforesaid diffractive structure, efficiencies of diffraction for respective diffracted lights are equalized. Since the light flux guided to an information recording surface of the optical information recording medium is only one of the aforesaid diffracted lights, the light intensity is certainly lowered to 50% or less of that of the incident light.

Patent Document 1: Japanese Patent Publication Open to Public Inspection No. 2002-298422

DISCLOSURE OF THE INVENTION

The present invention has been achieved, in view of the problems of the conventional technologies, and an object is to provide an objective optical element for an optical pickup device capable of conducting excellent correction of spherical aberration, an objective optical element unit for an optical pickup device and an optical pickup device.

To achieve the aforesaid object, the structure relating to the invention includes an optical element for the optical pickup device including an optical path difference providing structure which provides a substantial phase change to a light flux having its specific wavelength, and the optical path difference providing structure includes a step portion equipped with a step whose height in the optical axis direction is small.

BEST MODE FOR CARRYING OUT THE INVENTION

Figure 1:
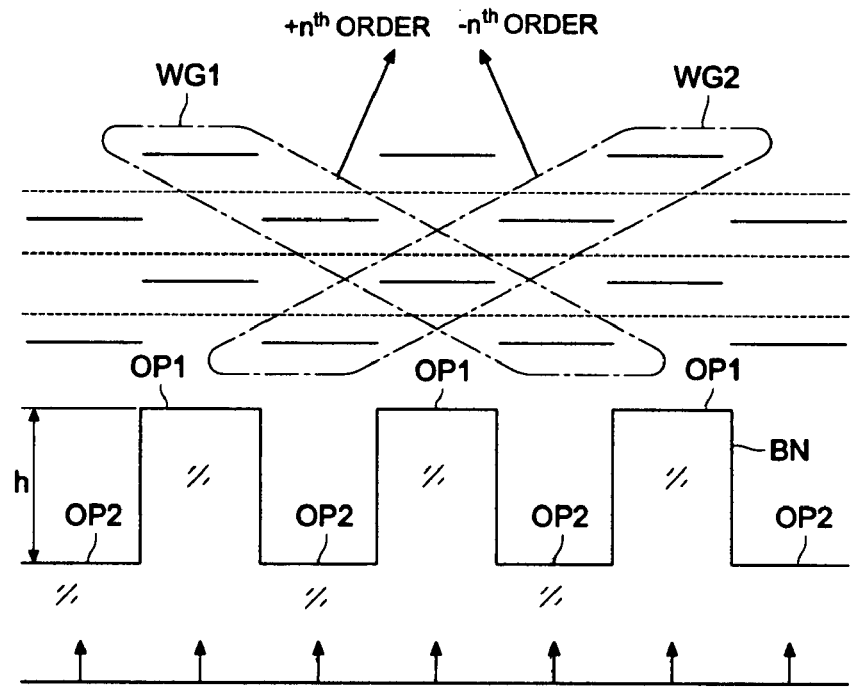
FIG. 1 is a diagram showing an enlarged section of a first optical path difference providing structure (exemplified by a ring-shaped zone structure of a binary type) relating to the Comparative Example.

A preferred embodiment relating to the present invention will be explained as follows.

(Item 1) An objective optical element for use in an optical pickup device for recording and/or reproducing information on a first optical information recording medium having a protective layer with a thickness t1 by converging a light flux with a wavelength λ1 through an objective optical element onto an information recording surface of the first optical information recording medium when information is recorded and/or reproduced on the first optical information recording medium, and for recording and/or reproducing information on a third optical information recording medium having a protective layer with a thickness t3 (t1<t3) by converging a light flux with a wavelength λ3 (λ1<λ3) through the objective optical element onto an information recording surface of the third optical information recording medium when information is recorded and/or reproduced on the third optical information recording medium, the objective optical element comprising: a first optical path difference providing structure providing an optical path difference so as to provide a substantial phase change with the light flux with the wavelength λ3 and not to provide a substantial phase change with the light flux with the wavelength λ1, wherein the first optical path difference providing structure comprises a step portion comprising a step difference whose height in an optical axis direction is smaller than the wavelength λ1.

(Item 2) The objective optical element for use in the optical pickup device of Item 1, wherein when the light flux with the wavelength λ3 passes through the first optical path difference providing structure comprising the step portion, the first optical path difference providing structure generates at least n th order and −n th order diffracted light fluxes (where n is a natural number), and one of the n th order and −n th order diffracted light fluxes has a larger light amount than a light flux in any other diffraction order generated by the first optical path difference providing structure, and wherein when the light flux with the wavelength λ1 passes through the first optical path difference providing structure comprising the step portion, the first optical path difference providing structure generates at least 0th order diffracted light flux, and the 0th order diffracted light flux has a larger light amount than a light flux in any other diffraction order generated by the first optical path difference providing structure.

(Item 3) The objective optical element for use in the optical pickup device of Item 1 or 2, wherein the first optical path difference providing structure comprises a plurality of ring-shaped zones each comprising a step difference whose height in the optical axis direction is larger than the wavelength λ1 and each forming a ring shape whose center locates at an optical axis when viewed from the optical axis direction, and the step portion comprising the step difference whose height in the optical axis direction is smaller than the wavelength λ1, is formed in a ring shape arranged on an internal circumference side of each of the plurality of ring-shaped zones of the first optical path difference providing structure when viewed from the optical axis direction, or is formed in a ring shape arranged on an outer circumference side of each of the plurality of ring-shaped zones of the first optical path difference providing structure when viewed from the optical axis direction.

(Item 4) An objective optical element for use in an optical pickup device for recording and/or reproducing information on a first optical information recording medium having a protective layer with a thickness t1 by converging a light flux with a wavelength λ1 through an objective optical element onto an information recording surface of the first optical information recording medium when information is recorded and/or reproduced on the first optical information recording medium, for recording and/or reproducing information on a second optical information recording medium having a protective layer with a thickness t2 (t1≦t2) by converging a light flux with a wavelength λ2 (λ1<λ2) through the objective optical element onto an information recording surface of the second optical information recording medium when information is recorded and/or reproduced on the second optical information recording medium, and for recording and/or reproducing information on a third optical information recording medium having a protective layer with a thickness t3 (t2<t3) by converging a light flux with a wavelength λ3 (λ2<λ3) through an objective optical element onto an information recording surface of the third optical information recording medium when information is recorded and/or reproduced on the third optical information recording medium, the objective optical element comprising:

a first optical path difference providing structure providing an optical path difference so as to provide a substantial phase change with the light flux with the wavelength λ3 and not to provide a substantial phase change with each of the light flux with the wavelength λ1 and the light flux with the wavelength λ2, and a second optical path difference providing structure providing an optical path difference so as to provide a substantial phase change with the light flux with the wavelength λ2 and not to provide a substantial phase change with each of the light flux with the wavelength λ1 and the light flux with the wavelength λ3, wherein at least one of the first optical path difference providing structure and the second optical path difference providing structure comprises a step portion comprising a step difference whose height in an optical axis direction is smaller than the wavelength λ1.

(Item 5) The objective optical element for use in the optical pickup device of Item 4, wherein when the light flux with the wavelength λ3 passes through the optical path difference providing structure comprising the step portion, the optical path difference providing structure generates at least n th order and −n th order diffracted light fluxes (where n is a natural number), and one of the n th order and −n th order diffracted light fluxes has a larger light amount than a light flux in any other diffraction order generated by the optical path difference providing structure, and wherein when the light flux with the wavelength λ1 or λ2 passes through the optical path difference providing structure comprising the step portion, the optical path difference providing structure, generates at least 0th order diffracted light flux, and the 0th order diffracted light flux has a larger light amount than a light flux in any other diffraction order generated by the optical path difference providing structure.

(Item 6) The objective optical element for use in the optical pickup device of Item 4 or 5, wherein each of the first optical path difference providing structure and the second optical path difference providing structure comprises a plurality of ring-shaped zones each comprising a step difference whose height in an optical axis direction is larger than the wavelength λ1 and each forming a ring shape whose center locates at the optical axis when viewed from the optical axis direction, and wherein when the first optical path difference providing structure comprises the step portion comprising the step difference whose height in the optical axis direction is smaller than the wavelength λ1, the step portion comprising the step difference whose height in the optical axis direction is smaller than the wavelength λ1, is formed in a ring shape arranged on an internal circumference side of each of the plurality of ring-shaped zones of the first optical path difference providing structure, or is formed in a ring shape arranged on an outer circumference side of each of the plurality of ring-shaped zones of the first optical path difference providing structure, and when the second optical path difference providing structure comprises the step portion comprising the step difference whose height in the optical axis direction is smaller than the wavelength λ1, the step portion comprising the step difference whose height in the optical axis direction is smaller than the wavelength λ1, is formed in a ring shape arranged on an internal circumference side of each of the plurality of ring-shaped zones of the second optical path difference providing structure, or is formed in a ring shape arranged on an outer circumference side of each of the plurality of ring-shaped zones of the second optical path difference providing structure.

From a viewpoint that it is difficult to carry out aberration correction so that recording and/or reproducing of information may be conducted properly for all light fluxes having respectively three different wavelengths, by using a single diffractive structure, for example, correction of spherical aberration or of wavefront aberration is carried out in the structure relating to the present invention, by using the aforesaid first optical path difference providing structure in a way to provide an optical path difference so that a substantial phase change may be given only to the aforesaid light flux with the wavelength λ3 in advance. Further, by correcting spherical aberration or wavefront aberration by providing mainly the optical path difference to the aforesaid light fluxes having respectively wavelength λ1 and wavelength λ2 with the use of the aforesaid second optical path difference providing structure, a load on each optical path difference providing structure is reduced, and aberration corrections are carried out for all light fluxes having respectively three different wavelengths in total. Owing to this, appropriate recording and/or reproducing of information can be carried out. Incidentally, "no substantial phase change" means not only an occasion where the phase change does not exist at all, but also an occasion where a phase change within ±0.2π (preferably, within 0.1π) exists. Further, "substantial phase change" means an occasion where a phase change exceeding ±0.2π exists.

However, if an optical path difference is provided so that a substantial phase change may be given only to the aforesaid light flux with wavelength λ3 in advance by using the aforesaid first optical path difference providing structure, diffraction efficiencies for the diffracted light of +n$^{th}$ order and for the diffracted light of $-n^{th}$ order for the light flux with wavelength $\lambda 3$ having passed through the first optical path difference providing structure become the equal level. Only one of the aforesaid diffracted lights becomes a light flux guided to an information recording surface of the optical information recording medium. Therefore the guided light flux is certainly lowered in terms of light intensity to 50% or less of that of the incident light. This will be explained specifically as follows.

FIG. 1 is a diagram showing an enlarged section of a first optical path difference providing structure (exemplified by a ring-shaped zone structure of a binary type) relating to the Comparative Example, in which the vertical direction is assumed to be an optical axis direction. The ring-shaped zone structure of a binary type is one wherein a plurality of ring-shaped zones each having the same height h in the optical axis direction are arranged around the optical axis. When OP1 represents a top surface of a ring-shaped zone and OP2 represents a bottom surface between ring-shaped zones, a phase change is generated between a light flux emitted from surface OP1 and a light flux emitted from surface OP2.

However, if height h in the optical axis direction is made to be a multiple of an integer of wavelength $\lambda 1$ and to be a multiple of an integer of wavelength $\lambda 2$, the wavefront of the light flux emitted from surface OP2 travels and overlaps with the wavefront of the light flux emitted from surface OP1. Thus, the phase change is not generated apparently, and $0^{th}$ order diffracted light becomes highest in terms of light intensity (see dotted lines in FIG. 1).

On the other hand, if the height h in the optical axis direction is not made to be a multiple of an integer of wavelength $\lambda 3$, there is generated a phase change between the wavefront of the light flux emitted from surface OP2 and the wavefront of the light flux emitted from surface OP1 as shown by solid lines in FIG. 1, and thereby, light intensity (for example, 40% of light intensity of incident light flux) of $+n^{th}$ order diffracted light is enhanced to be higher by wavefront group WG1 shown by one-dot chain lines and light intensity (for example, 40% of light intensity of incident light flux) of $-n^{th}$ order diffracted light is enhanced to be higher by wavefront group WG2 shown by two-dot chain lines. If the optical axis is assumed to be on the right side in FIG. 1, it is possible to conduct recording and/or reproducing of information for the third optical information recording medium having a different protective substrate thickness, by using $+n^{th}$ order diffracted light. The remaining 20% is lost by dispersion and absorption.

However, since the light intensity of the light flux used for recording and/or reproducing of information for the third optical information recording medium becomes 40% which is relatively low, it is necessary to increase an amount of light of the third light source for avoiding reading troubles, which, however, causes a fear of a cost increase.

Even in the case of the structure wherein light fluxes having respectively two different wavelengths enter an objective optical element, light intensity of the light flux used for recording and/or reproducing of information becomes 50% or less, resulting in a fear that the same problems are caused.

In the structure relating to the invention, therefore, an amount of light of $+n^{th}$ order diffracted light is increased in the following way.

Figure 2:
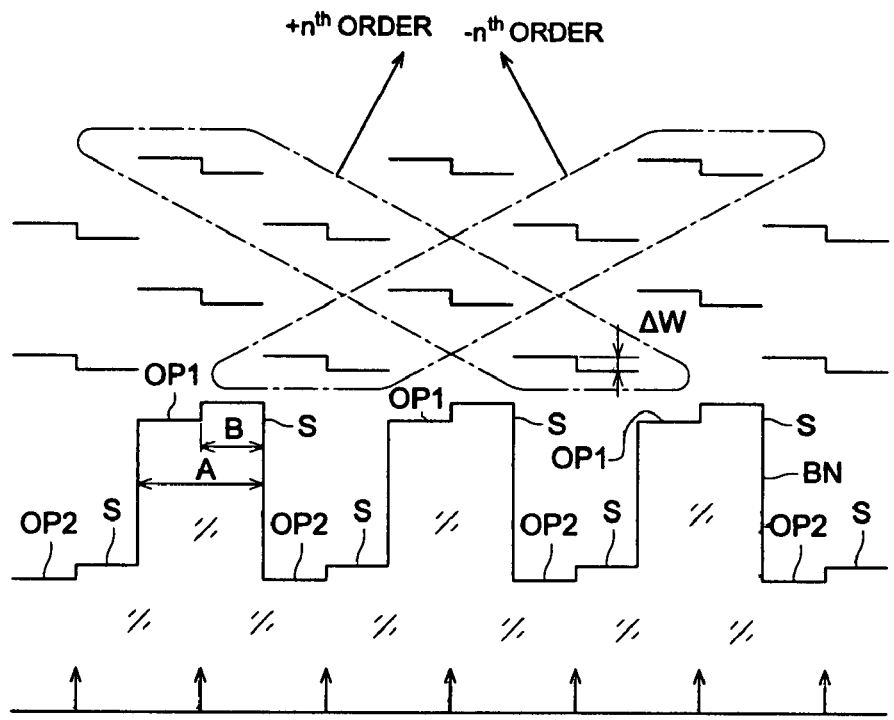
FIG. 2 is a diagram showing an enlarged section of the first optical path difference providing structure (exemplified by a ring-shaped zone structure of a binary type) relating to the invention.

FIG. 2 is a diagram showing an enlarged section of the first optical path difference providing structure (exemplified by a ring-shaped zone structure of a binary type) relating to the invention. What is different from the ring-shaped zone structure BN in FIG. 1 is a point that step portion S is formed to be close to the optical axis (right side) on each of surface OP1 and surface OP2 which are in a shape of ring-shaped zones. A height of the step portion S in the optical axis direction (for example, approx. 100 nm) is smaller than wavelength $\lambda 1$ that is the shortest wavelength. Incidentally, height of the step portion S in the optical axis direction does not need to be uniform, and for example, it is also possible to employ a tapered surface wherein a height of the step portion S grows to be higher gradually toward the optical axis side. However, in the case of an occasion to work upon a molding die that forms an objective optical element by using a flat point turning tool, it is preferable that height of the step portion S in the optical axis direction is uniform. Further, a step difference between surface OP1 and surface OP2 (height h in the optical axis direction) is of the same structure as that in FIG. 1.

When the light flux having wavelength $\lambda 3$ passes through ring-shaped zone structure BN in FIG. 2, a phase change of $\Delta W$ is generated between the wavefront of wavelength $\lambda 3$ passing through surface OP1 and surface OP2 where no step portion S is formed and the wavefront of wavelength $\lambda 3$ passing through surface OP1 and surface OP2 where step portion S is formed. Namely, a phase change of a light flux with wavelength $\lambda 3$ generated according to a step difference between surface OP1 and surface OP2 becomes smaller locally. Then, the apparent wavefront formed by group WG1 of the wavefront shown with one-dot chain lines becomes weaker than the apparent wavefront formed by group WG2 of the wavefront shown with two-dot chain lines, resulting in that the light intensity of $+n^{th}$ order diffracted light can be enhanced, for example, to 50% or more.

Figure 6:
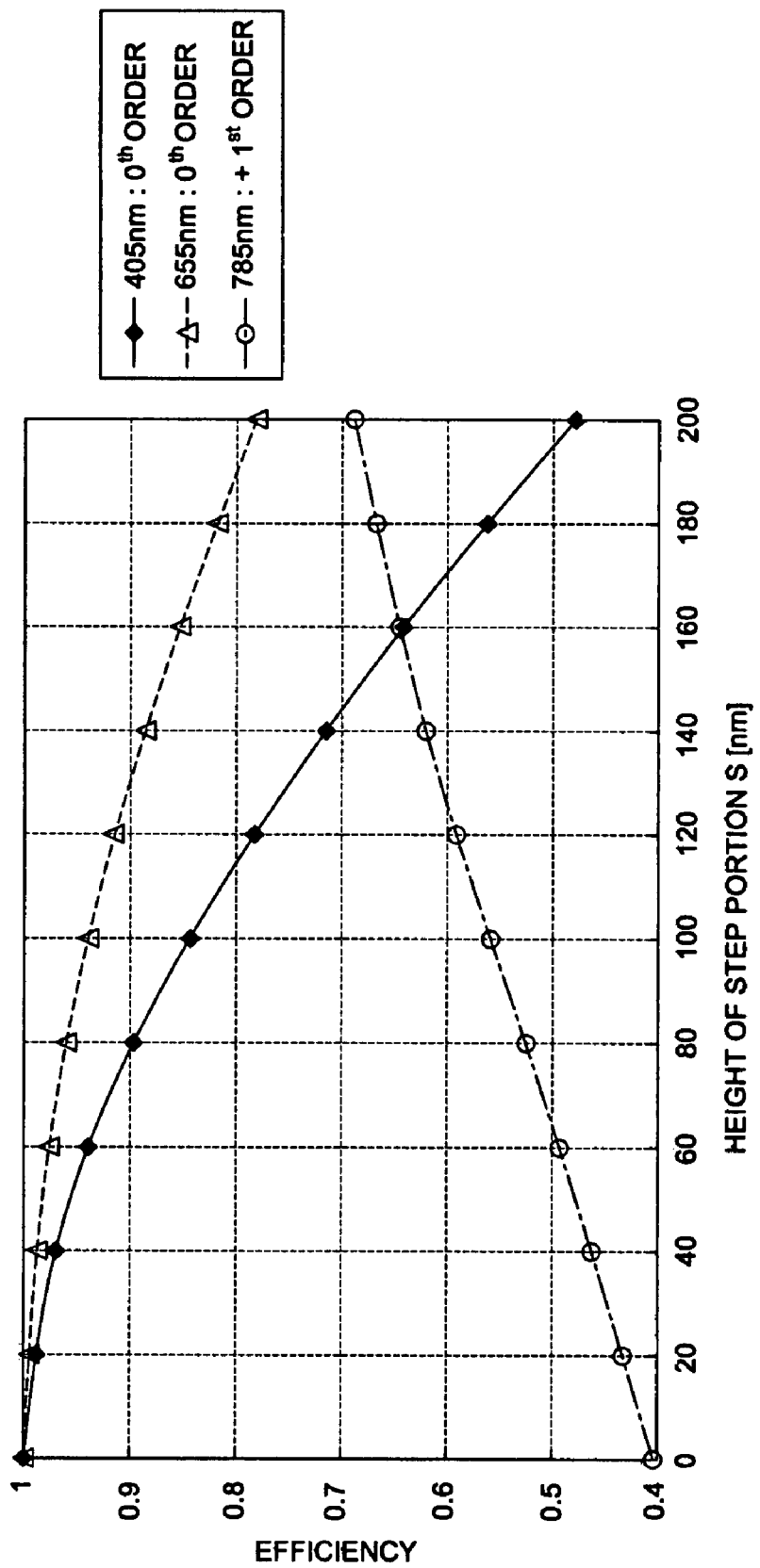
FIG. 6 is a graph showing relationship between a height of step portion S and a diffraction efficiency in the ring-shaped zone structure of a binary type.
Figure 7:
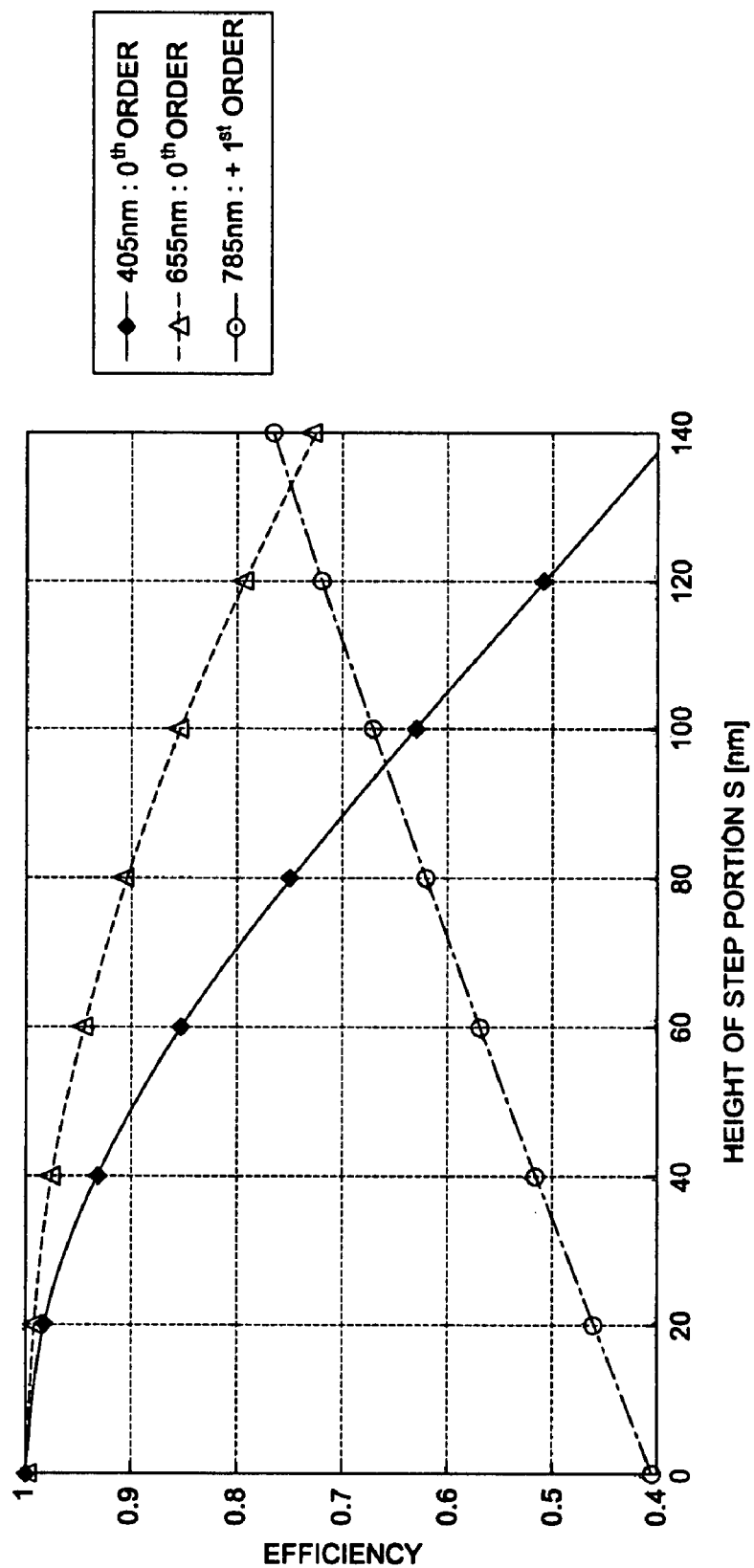
FIG. 7 is a graph showing relationship between a height of step portion S and a diffraction efficiency in the ring-shaped zone structure of a binary type.
Figure 8:
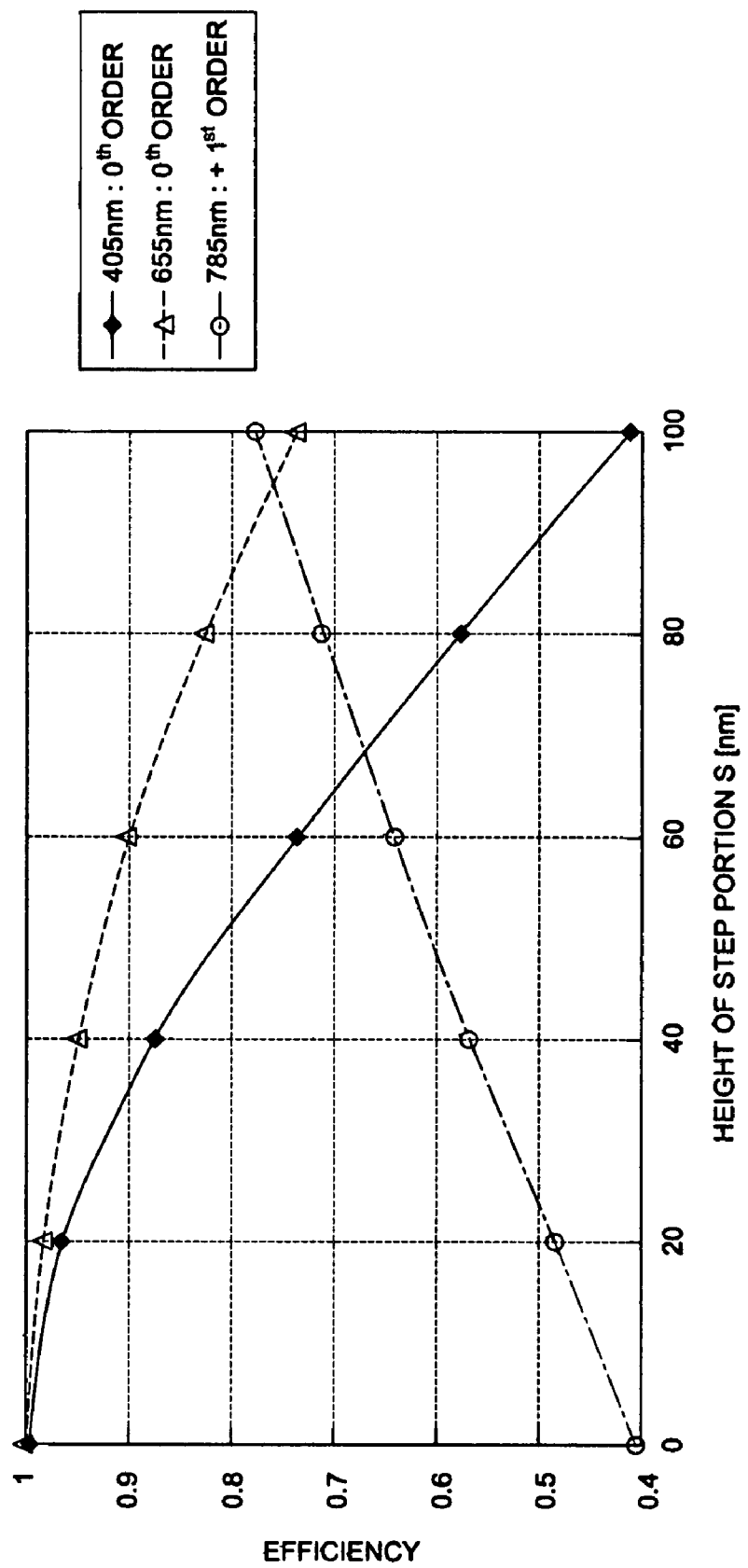
FIG. 8 is a graph showing relationship between a height of step portion S and a diffraction efficiency in the ring-shaped zone structure of a binary type.
Figure 10:
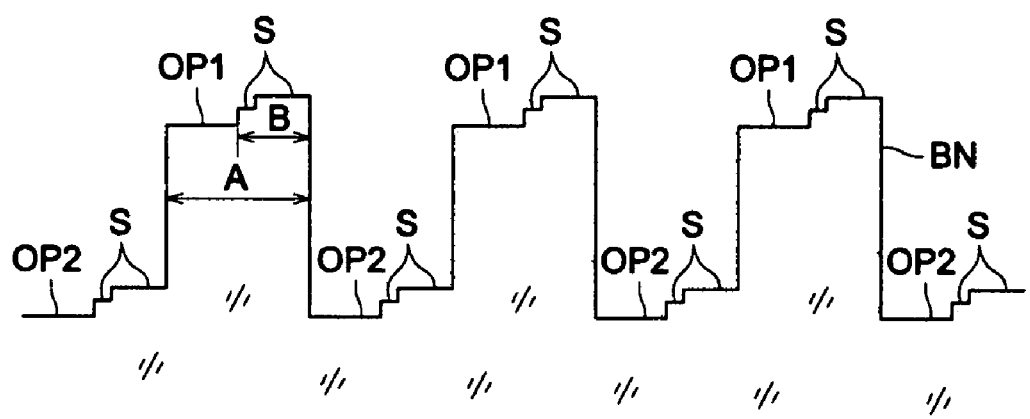
FIG. 10 is a diagram showing an enlarged section of the second optical path difference providing structure (exemplified by a structure of ring-shaped zones of an echelon type) in the case of plural step portions S.
Figure 11:
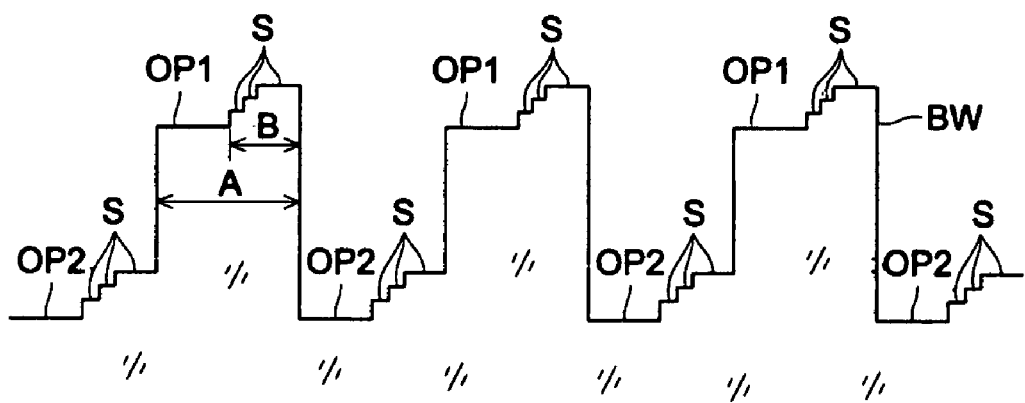
FIG. 11 is a diagram showing an enlarged section of the second optical path difference providing structure (exemplified by a ring-shaped zone structure of an echelon type) in the case of plural step portions S.

Specific examples will be explained as follows, giving numerical values below. FIG. 6 shows an occasion wherein one step portion S is provided inside each ring-shaped zone (see FIG. 2), FIG. 7 shows an occasion wherein two step portions S are provided inside each ring-shaped zone (see FIG. 10) and FIG. 8 shows an occasion wherein three step portions S are provided inside each ring-shaped zone (see FIG. 11). When providing plural step portions S, it is preferable to provide each step portion S in a staircase pattern, as shown in FIG. 10.

Incidentally, an optical element is formed by material whose refractive index at d line is 1.5 and Abbe's number at d line is 60, and height h of each ring-shaped zone structure (namely, a step difference between surface OP1 and surface OP2) is set to 3.940 μm. Optical path differences to be provided respectively to light fluxes which respectively have wavelength $\lambda 1$, wavelength $\lambda 2$ and wavelength $\lambda 3$ are $5 \times \lambda 1$, $3 \times \lambda 2$ and $2.5 \times \lambda 3$.

As shown in FIGS. 6-8, diffraction efficiencies for $0^{th}$ order diffracted light for wavelength 405 nm, $0^{th}$ order diffracted light for wavelength 655 nm and for $1^{st}$ order diffracted light for wavelength 785 nm change depending on a height of step portion S. When a height of step portion S is greater, the diffraction efficiency for the $+1^{st}$ order diffracted light for wavelength 785 nm can be improved more, but, diffraction efficiencies for the $0^{th}$ order diffracted light for wavelength 405 nm and for the $0^{th}$ order diffracted light for wavelength 655 nm are lowered, on the other side. When determining a height of the step portion S, it is preferable to determine it by considering a balance of diffraction efficiencies for these three wavelengths.

In the specific method for determining the height, using the wavelength $\lambda 1$ representing the shortest wavelength among wavelengths passing through the ring-shaped zone structure as a reference, a height of step portion S is determined so that a height of a step portion may be smaller than $\lambda 1$ when single step portion S is provided on one ring-shaped zone, and a height of step portion S is determined so that the sum total of heights of plural step portions S may be smaller than λ1 when plural step portions S are provided on the ring-shaped zones.

More specifically, it is preferable to set a height of step portion S to be within a range of 60 nm-170 nm when providing one step portion S inside each ring-shaped zone (see FIG. 6), it is preferable to set a height of step portion S to be within a range of 30 nm-110 nm when providing two step portions S inside each ring-shaped zone (see FIG. 7), and it is preferable to set a height of step portion S to be within a range of 25 nm-80 nm when providing three step portions S inside each ring-shaped zone (see FIG. 8).

Incidentally, as is apparent from FIG. 2, if the step portion S is formed to be close to the optical axis side on surfaces OP1 and OP2, light intensity of $+n^{th}$ order diffracted light is enhanced, alternately, if the step portion S is formed to be away from the optical axis in contrast to the foregoing, light intensity of $-n^{th}$ order diffracted light is enhanced. This phenomenon is effective when giving an angle of divergence to emerging light. Further, it is also possible to provide the same step portion S on the second optical path difference providing structure.

(Item 7) The objective optical element for use in the optical pickup device of any one of Items 1 to 6,
wherein the optical path difference providing structure comprising the step portion is a ring-shaped zone structure in a blaze shape.

(Item 8) The objective optical element for use in the optical pickup device of any one of Items 1 to 6,
wherein the optical path difference providing structure comprising the step portion is a ring-shaped zone structure of a binary type.

(Item 9) The objective optical element for use in the optical pickup device of any one of Items 1 to 6,
wherein the optical path difference providing structure comprising the step portion is a ring-shaped zone structure of an echelon type.

Figure 3:
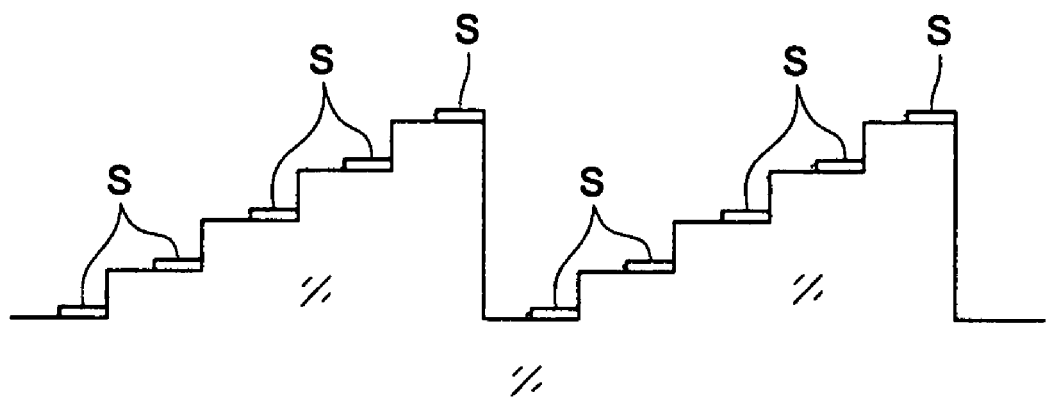
FIG. 3 is a diagram showing an enlarged section of a second optical path difference providing structure (exemplified by a ring-shaped zone structure of an echelon type).

FIG. 3 is a diagram showing an enlarged section of the first optical path difference providing structure relating to the invention (exemplified by a ring-shaped zone structure of an echelon type). The ring-shaped zone structure of an echelon type is one wherein plural ring-shaped zones whose section in the optical axis direction is in a shape of a staircase. As shown in FIG. 3, the ring-shaped zone structure of an echelon type is of a staircase structure, and it is possible to increase light intensity of $+n^{th}$ order diffracted light in the same way as in FIG. 2, by providing step portion S for each staircase. In the meantime, there is no restriction in using a ring-shaped zone structure in a blaze shape in place of structures shown in FIGS. 2 and 3.

Figure 9:
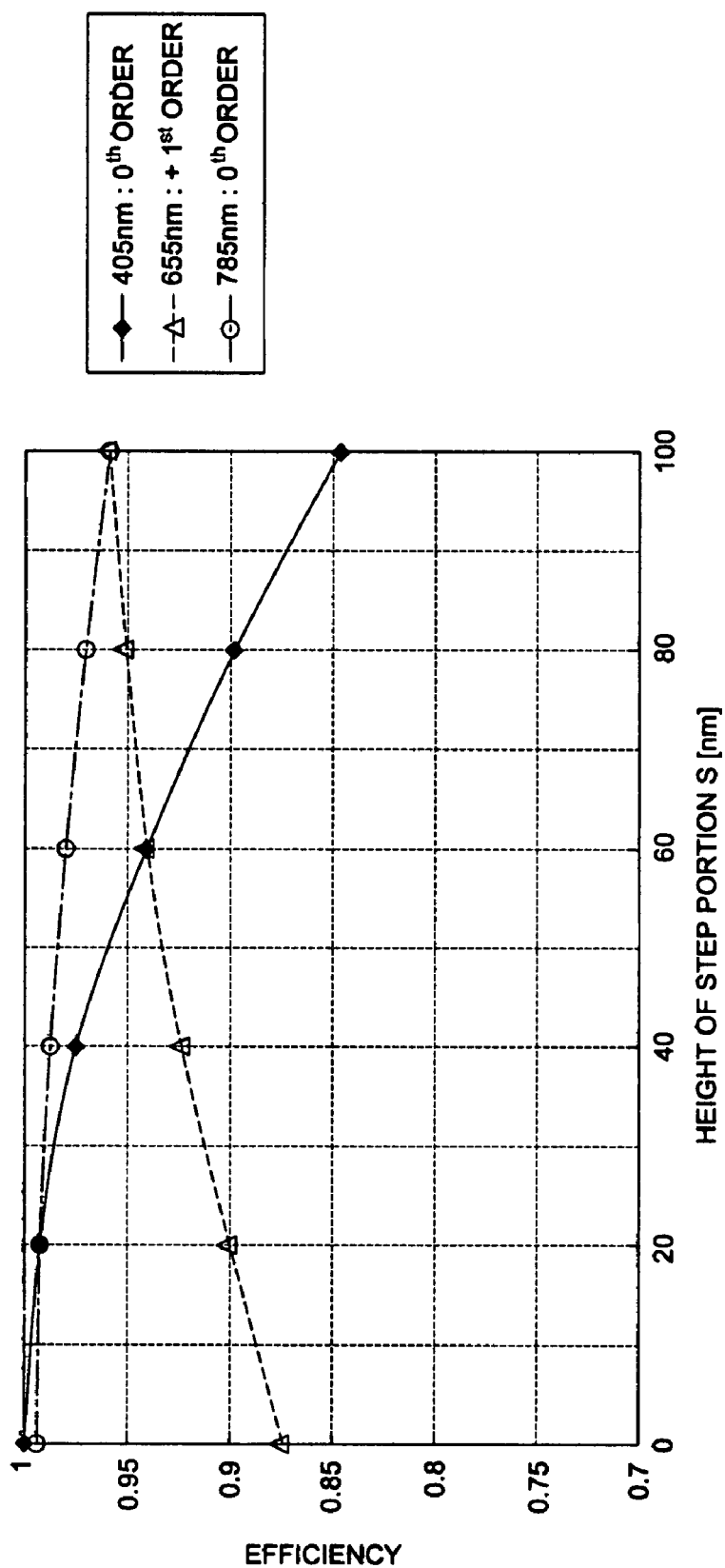
FIG. 9 is a graph showing relationship between a height of step portion S (step portion S is provided inside each staircase) and a diffraction efficiency in the ring-shaped zone structure of an echelon type.

Specific examples will be explained as follows, giving numerical values below. FIG. 9 shows a graph indicating relationship between a height of step portion S (a single step portion S is provided inside each staircase) and diffraction efficiency. Incidentally, the optical element is made of a material whose refractive index at d line is 1.5 and Abbe's number at d line is 60, and a height of each step is established to be 1.576 μm. Optical path differences provided respectively to light flexes having respectively wavelength λ1, wavelength λ2 and wavelength λ3 depending on a height of each staircase are 2×λ1, 1.2×λ2 and 1×λ3.

As shown in FIG. 9, diffraction efficiencies of $0^{th}$ order diffracted light for wavelength 405 nm, $+1^{st}$ order diffracted light for wavelength 655 nm and for $0^{th}$ order diffracted light for wavelength 785 nm change depending on a height of step portion S. When a height of step portion S is greater, the diffraction efficiency of the $+1^{st}$ order diffracted light for wavelength 655 nm can be improved more, but, diffraction efficiencies of the $0^{th}$ order diffracted light for wavelength 405 nm and of the $0^{th}$ order diffracted light for wavelength 785 nm are lowered, on the other side. When determining a height of the step portion S, it is preferable to determine it by considering a balance of diffraction efficiencies for these three wavelengths.

To be concrete, when providing one step portion S inside each staircase, it is preferable to establish a height of stop portion S to be within a range of 20 nm-100 mm.

(Item 10) The objective optical element for use in the optical pickup device of any one of Items 6 to 9,
wherein the step portion is arranged on each of the ring-shaped zones of the optical path difference providing structure comprising the step portion, and forms a ring shape whose center locates at an optical axis, and
the objective optical element satisfies a following expression when the ring-shaped zones of the optical path difference providing structure comprising the step portion have a width A perpendicular to the optical axis, and the step portion formed with corresponding to each of the ring-shaped zones has a width B perpendicular to the optical axis.

$$0.1 \leq B/A \leq 0.9 \tag{1}$$

(Item 11) The objective optical element for use in the optical pickup device of any one of Items 1 to 10,
wherein the optical path difference providing structure comprising the step portion, comprises a plurality of step portions whose height in the optical axis direction is smaller than the wavelength λ1, and
the total height in the optical axis direction of the plurality of step portions is smaller than the wavelength λ1.

When it is assumed that A is a width in a direction perpendicular to the optical axis of ring-shaped surfaces OP1 and OP2 and B is a width in a direction perpendicular to the optical axis of the step portion with referring to FIG. 2, the value of B/A which is too large or too small cannot demonstrate a desired effect. Therefore, when the value is set to satisfy the expression (1), it demonstrates the effect of step portion S effectively. Herein, it is more preferable that the value satisfies the following expression.

$$0.2 \leq B/A \leq 0.8 \tag{1'}$$

Further, when the plural step portions are provided as shown in FIG. 10, it is preferable that the following expression is satisfied, where it is assumed that A is a width in a direction perpendicular to the optical axis of ring-shaped surfaces OP1 and OP2, and B is a width in a direction perpendicular to the optical axis of the total height of the plural step portions.

$$0.3 \leq B/A \leq 0.7 \tag{1''}$$

(Item 12) An optical pickup device comprising the objective optical element for use in the optical pickup element of any one of Items 1 to 11.

(Item 13) An optical element for use in an optical pickup device, comprising:
an optical path difference providing structure comprising a plurality of first ring-shaped zones each comprising a first step difference along an optical axis and each forming a ring shape whose center locates at an optical axis when viewed from an optical axis direction, the optical path difference providing structure providing a phase difference at between neighboring first ring-shaped zones in the plurality of ring-shaped zones with a light flux with a predetermined wavelength emitted from a light source mounted in the optical pickup device; and a step portion extending along each of the plurality of first ring-shaped zones, wherein the step portion locally reduces a phase difference generated with corresponding to the first step difference at between the neighboring first ring-shaped zones, in the light flux with the predetermined wavelength passing through the first step difference of the plurality of first ring-shaped zones.

A function and effect of this structure is the same to those of Item 1.

(Item 14) An optical element for use in an optical pickup device, comprising:

an optical path difference providing structure comprising a plurality of first ring-shaped zones each comprising a first step difference along an optical axis and each having a ring shape whose center locates at the optical axis when viewed from an optical axis direction, the optical path difference providing structure providing a phase difference at between neighboring first ring-shaped zones in the plurality of ring-shaped zones with a light flux with a predetermined wavelength emitted from a light source mounted in the optical pickup device; and a step portion comprising a second step difference whose height in the optical axis direction is smaller than the first step difference, the step portion being formed in a ring shape arranged on an internal circumference side of each of the plurality of ring-shaped zones of the optical path difference providing structure when viewed from an optical axis direction, or is formed in a ring shape arranged on an outer circumference side of each of the plurality of ring-shaped zones of the optical path difference providing structure when viewed from the optical axis direction.

A function and effect of this structure is the same to those of Item 1.

(Item 15) The optical element for use in the optical pickup device of Items 13 or 14, wherein when the light flux with the predetermined wavelength passes through the optical path difference providing structure comprising the step portion, the optical path difference providing structure generates at least n th order and −n th order diffracted light fluxes (where n is a natural number), and one of the n th order and −n th order diffracted light fluxes has a larger light amount than a light flux in any other diffraction order generated by the optical path difference providing structure.

(Item 16) An objective optical element unit for use in an optical pickup device, comprising:

the optical element for use in the optical pickup device of claim 13 or 14; and a light converging optical element, wherein the optical element for use in the optical pickup device and the light converging optical element are fixed in a lens frame.

(Item 17) An optical pickup device comprising the optical element for use in the optical pickup device of Item 13 or 14, or the objective optical element unit for use in the optical pickup device of Item 16.

When one or more optical elements are mounted on an actuator on which a converging optical element (light converging lens) is arranged to be closest to the optical information recording medium side in addition to its converging optical element, in the present specification, all of the optical elements mounted on the actuator are called "an objective optical element".

In the present specification, the first optical information recording medium includes optical disc (for example, HD DVD) that conducts recording and/or reproducing of information with an objective optical element having NA of 0.65 to 0.67, for example and has a standard that a thickness of a protective substrate is about 0.6 mm and includes optical disc (for example, a blue ray disc which is also called BD) that conducts recording and/or reproducing of information with an objective optical element having NA of 0.85, and has a standard that a thickness of a protective substrate is about 0.1 mm. The second optical information recording medium is one including optical discs of various types of DVD bases such as DVD-RAM serving also reproducing/recording, DVD-R and DVD-RW in addition to DVD-ROM used exclusively for reproducing and DVD-Video. The third optical information recording medium is an optical disc of a CD type such as CD-R and CD-RW. Incidentally, in the present specification, a thickness of a protective substrate includes also a thickness of 0 mm.

Figure 4:
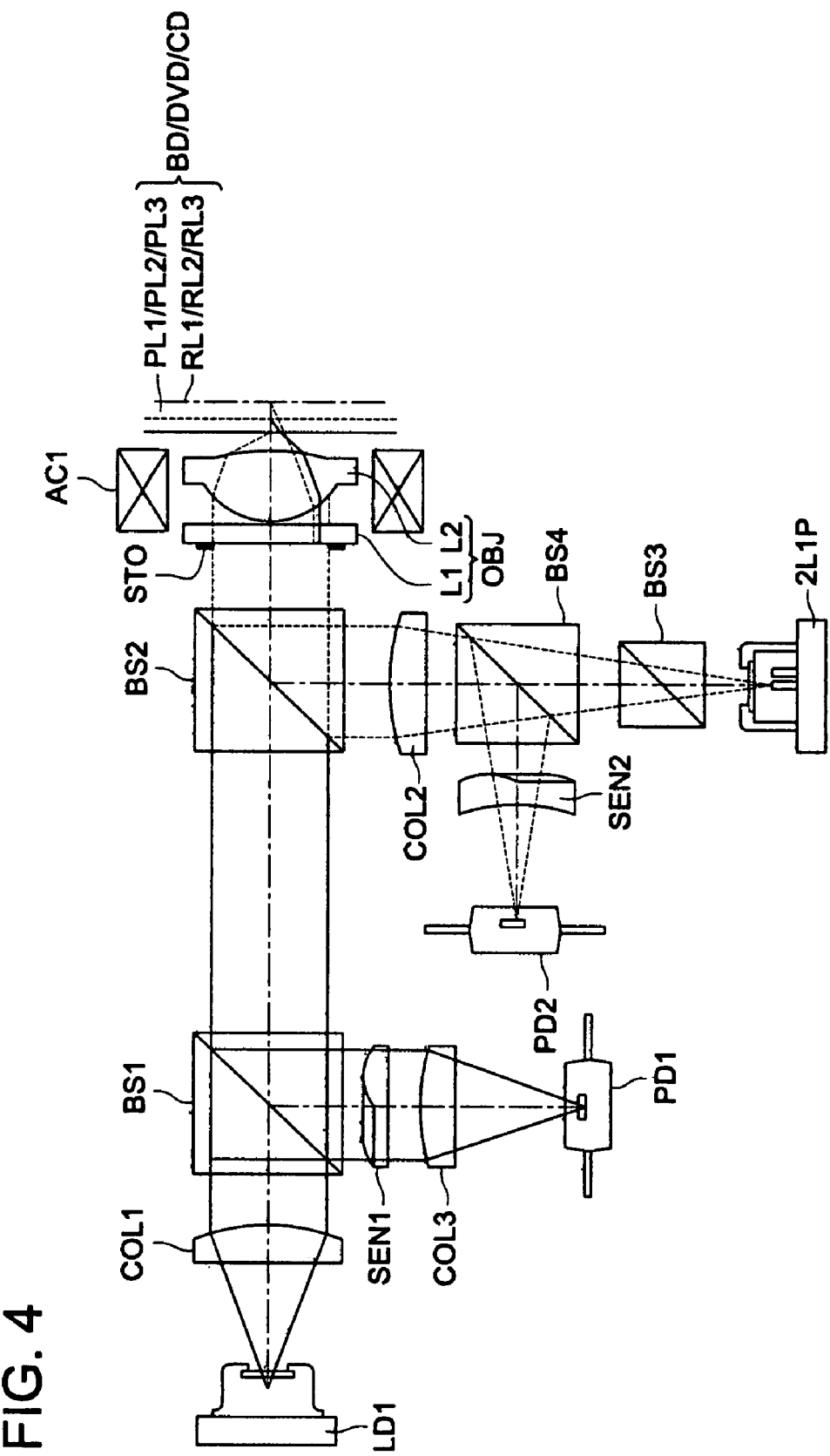
FIG. 4 is a schematic sectional view of an optical pickup device relating to the present embodiment.

An embodiment of the invention will be explained as follows, referring to the drawings. FIG. 4 is a diagram showing schematically the structure of first optical pickup device PU capable of conducting recording and/or reproducing of information properly for any one of a high density optical disc BD (first optical disc), DVD (second optical disc) and CD (third optical disc). Optical specifications of the high density optical disc BD includes first wavelength $\lambda 1=407$ nm, first protective layer PL1 thickness $t1=0.1$ mm and numerical aperture NA1=0.85. Optical specifications of DVD includes second wavelength $\lambda 2=655$ nm, second protective layer PL2 thickness $t2=0.6$ mm and numerical aperture NA2=0.65. Optical specifications of CD includes third wavelength $\lambda 3=785$ nm, third protective layer PL3 thickness $t3=1.2$ mm and numerical aperture NA3=0.51.

The optical pickup device PU is composed schematically of violet semiconductor laser LD1 that emits a laser light flux (first light flux) that is emitted when conducting recording and/or reproducing of information for a high density optical disc and has wavelength of 408 nm; laser unit 2L1P wherein a red semiconductor laser (second light source) that emits a laser light flux (second light flux) with wavelength 658 nm emitted in the case of recording and/or reproducing information for DVD and infrared semiconductor laser (third light source) that emits a laser light flux (third light flux) with wavelength 785 nm emitted in the case of recording and/or reproducing information for CD are housed in a package; first photo-detector PD1 that receives a reflected light flux coming from information recording surface RL1 of high density optical disc BD; second photo-detector PD2 that receives reflected light fluxes coming respectively from information recording surface RL2 of DVD and from information recording surface RL3 of CD; objective optical element OBJ composed of aberration correction element L1 (first optical element) and of light-converging element L2 (second optical element) having opposite aspheric surfaces and having a function to converge laser light fluxes transmitted through the aberration correction element L1 on information recording surfaces RL1, RL2 and RL3; biaxial actuator AC1; diaphragm STO corresponding to numerical aperture NA1 of high density optical disc BD; first-fourth beam splitters BS1-BS4; first-third collimator lenses COL1-COL3; first sensor lens SEN1; and second sensor lens SEN2.

When recording and/or reproducing information for high density optical disc BD in the optical pickup device PU, violet semiconductor laser LD1 is caused to emit light as its light beam path is drawn with solid lines in FIG. 4. A divergent light flux emitted from the violet semiconductor laser LD1 is transmitted through the first polarizing beam splitter BS1 after being converted into a parallel light flux by the first collimator lens COL1. Then, the light flux is regulated by diaphragm STO in terms of its diameter after being transmitted through second polarizing beam splitter BS2, to become a spot which is formed by objective optical element OBJ on information recording surface RL1 through first protective layer PL1. Incidentally, an effect exerted by the objective optical element OBJ upon a light flux with wavelength λ1 will be described later. The objective optical element OBJ conducts focusing and tracking with biaxial actuator AC1 that is arranged around the objective optical element OBJ.

A reflected light flux modulated by information pits on information recording surface RL1 is reflected by the first polarizing beam splitter BS1 after passing through the objective optical element OBJ and the second polarizing beam splitter BS2 again. Then, the light flux is given astigmatism by sensor lens SEN1, and is converted into a converged light flux by third collimator lens COL3 to be converged on a light-receiving surface of the first photo-detector PD1. Thus, information recorded on high density optical disc BD can be read by the use of output signals of the first photo-detector PD1.

When conducting recording and/or reproducing of information for DVD, a second light source of laser unit 2L1P is caused to emit light first. A divergent light flux emitted from the laser unit 2L1P passes through a third polarizing beam splitter and a fourth polarizing beam splitter as its light beam path is drawn with dotted lines in FIG. 4. Then, the light flux is reflected by the second polarizing beam splitter BS2 after being converted into a parallel light flux by the second collimator lens COL2, to become a spot which is formed by objective optical element OBJ on information recording surface RL2 through second protective layer PL2. Incidentally, an effect exerted by the objective optical element OBJ upon a light flux with wavelength λ2 will be described later. The objective optical element OBJ conducts focusing and tracking with biaxial actuator AC1 that is arranged around the objective optical element OBJ. A reflected light flux modulated by information pits on information recording surface RL2 passes the objective optical element OBJ again, then, is reflected by the second polarizing beam splitter. BS2. Then, the light flux is converted into a converged light flux by second collimator lens COL2, and is reflected by the fourth polarizing beam splitter BS4, then, is given astigmatism by second sensor lens SEN2, to be converged on a light-receiving surface of the second photo-detector PD2. Thus, information recorded on DVD can be read by the use of output signals of the second photo-detector PD2.

When conducting recording and/or reproducing of information for CD, a third light source of laser unit 2L1P is caused to emit light. A divergent light flux emitted from the laser unit 2L1P passes through a third polarizing beam splitter and a fourth polarizing beam splitter which is not illustrated, and is converted into a parallel light flux by the second collimator lens COL2. Then, the light flux is reflected by the second polarizing beam splitter BS2 to become a spot which is formed by objective optical element OBJ on information recording surface RL3 through third protective layer PL3. Incidentally, an effect exerted by the objective optical element OBJ upon a light flux with wavelength λ3 will be described later. The objective optical element OBJ conducts focusing and tracking with biaxial actuator AC1 that is arranged around the objective optical element OBJ. A reflected light flux modulated by information pits on information recording surface RL3 passes the objective optical element OBJ again, then, is reflected by the second polarizing beam splitter BS2. Then, the light flux is converted into a converged light flux by second collimator lens COL2, and is reflected by the fourth polarizing beam splitter BS4, then, is given astigmatism by second sensor lens SEN2, to be converged on a light-receiving surface of the second photo-detector PD2. Thus, information recorded on CD can be read by the use of output signals of the second photo-detector PD2.

Figure 5:
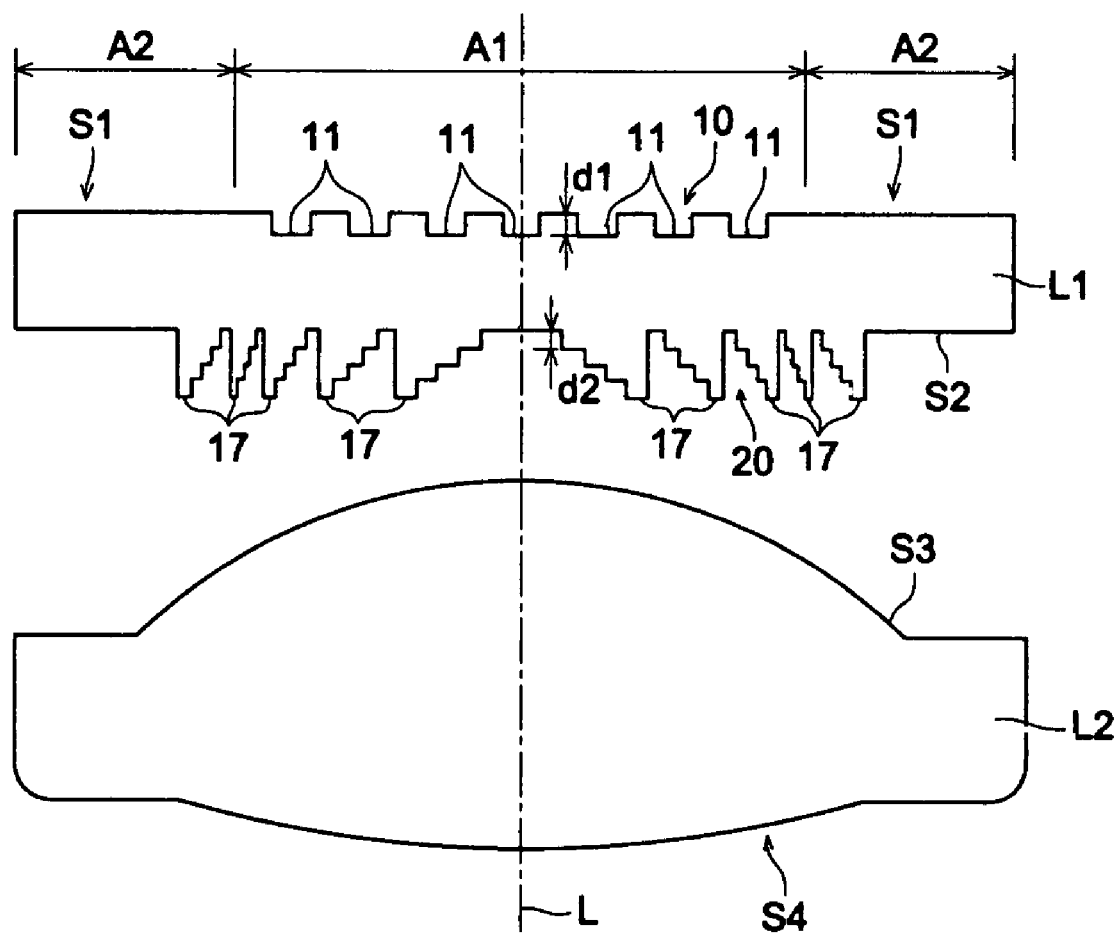
FIG. 5 is a schematic sectional view of objective optical element OBJ.

Next, how the objective optical element OBJ is made up will be explained. FIG. 5 is a schematic sectional view of objective optical element OBJ, wherein a shape of an optical surface is drawn exaggeratingly. The objective optical element OBJ is composed of aberration correction element L1 and light-converging element L2. On the circumference of each optical functional section (each area of aberration correction element L1 and of light-converging element L2, through which the first light flux passes), there is provided a flange section that is formed to be united solidly with the optical functional section, and a part of the flange section is connected to another part of the other flange section to integrate optical functional sections. When integrating aberration correction element L1 and light-converging element L2, they may also be integrated through a lens frame that is a separate member.

As shown in FIG. 5, optical surface S1 (an incident surface) of aberration correction element L1 on the semiconductor laser light source side is divided into first area (central area) A1 and the second area (peripheral area) A2. The first area is in a shape of concentric circle whose center is on the optical axis L corresponding to an area in NA3 and includes the optical axis L. The second area A2 is in a form of concentric circle formed on an area outside the first area A1. On the first area A1, there is formed first optical path difference providing structure (binary structure in this case) 10 representing the first optical path difference providing structure.

The first optical path difference providing structure 10 is composed of plural grooves (discontinuous section) 11 each having the same depth d1 in a form of concentric circles whose centers are on the optical axis. On the first optical path difference providing structure 10, there is formed step portion S like that shown in FIG. 2. Basic structures and effects of the first optical path difference providing structure 10 will be explained as follows, under the assumption that the step portion S is not formed.

The first optical path difference providing structure 10 is established so that a substantial phase change may be given only to the light flux with wavelength λ3 among light fluxes having respectively wavelength λ1, wavelength λ2 and wavelength λ3 all passing through grooves 11 and no phase change may be given substantially to the light fluxes respectively with wavelength λ1 and wavelength λ2. Since the light flux with wavelength λ3 is affected by diffraction by being provided a substantial phase change, the diffracted light having the highest diffraction efficiency among diffracted lights with wavelength λ3 generated by the diffraction can be utilized for recording and/or reproducing of information for CD.

Specifically, a design is made to satisfy $$4.7 \times d \leq d1 \leq 5.3 \times d \quad (1)$$

under the assumption that n1 represents a refractive index for the light flux with wavelength λ of aberration correction element L1 on which the first optical path difference providing structure 10 is formed 1, d1 represents an amount of a step difference in the optical axis direction of groove 11 in the first optical path difference providing structure 10, and d is equal to $\lambda 1/(n1-1)$.

Owing to the foregoing, amount of step difference d1 of the first optical path difference providing structure 10 is established to be a depth that is substantially a multiple of an integer of wavelength λ1. When a light flux with wavelength λ1 enters the grooved structure where the amount of step difference d1 is established in the aforesaid way, an optical path difference that is substantially a multiple of an integer of λ1 is generated between neighboring steps, and a substantial phase change is not provided to the light flux with wavelength λ1. Therefore, the incident light flux with wavelength λ1 is not diffracted in the first optical path difference providing structure 10 to be transmitted as it is. Further, when a light flux with wavelength λ2 enters this diffractive structure, a substantial phase change is not provided to the light flux with wavelength λ2 which is transmitted through this diffractive structure in the same way.

For an incident light flux with wavelength λ3, on the other hand, a phase change depending on the groove depth is generated. It is therefore possible to conduct recording and/or reproducing of information for CD by utilizing diffraction effects, for example, by utilizing a diffracted light with wavelength λ3 having high diffraction efficiency, and it is possible to conduct correction for chromatic aberration of CD and for spherical aberration resulting from temperature changes.

Further, for recording and reproducing of information for CD, only light fluxes having passed through the first area A1 out of the light flux with wavelength λ3 are used, which makes a light flux with wavelength λ3 which has passed through the second area A2 to be unwanted light. Therefore, it is possible to give diffraction effects by a diffractive structure (not shown) formed on the second area A2 so that a light flux with wavelength λ3 having passed through the second area A2 may not be converged on information recording surface RL3 of CD and to make diffracted light having a relatively high diffraction efficiency (for example, 30% or more among diffracted lights of different orders generated by the foregoing to be a flare. Due to this, it is possible to make objective optical element OBJ to have an aperture regulating function about NA3, and to make longitudinal spherical aberration of a light flux with wavelength λ3 to be discontinuous for the area from the first area A1 to the second area A2, thus, it is possible to improve detection accuracy of reflected light of a light flux with wavelength λ3 in the second photo-detector PD2.

Incidentally, when no step portion S is provided on the first optical path difference providing structure 10, diffraction efficiencies of plural diffracted lights with wavelength λ3 (for example, +1$^{st}$ order diffracted light and −1$^{st}$ order diffracted light) are mostly the same (for example, about 40%). Therefore, as shown in FIG. 2, when step portion S is provided, a phase change of a light flux with wavelength λ3 generated between neighboring ring-shaped zones depending on step amount d1 becomes smaller locally between neighboring ring-shaped zones of the first optical path difference providing structure 10, whereby, it is possible to enhance light intensity of +1$^{st}$ order diffracted light to 50% or more. Due to this, the +1$^{st}$ order diffracted light with wavelength λ3 has the highest diffraction efficiency, and this diffracted light can be used for conducting recording and/or reproducing of information for CD.

On the other hand, second optical path difference providing structure 20 is formed on optical surface S2 (emitting surface) of aberration correction element L1 on the optical disc side. As shown in FIG. 5, the second optical path difference providing structure 20 is composed of ring-shaped zones 17 whose cross section including optical axis L is in a form of a staircase. When amount of each step difference d2 is made to be a height in the optical axis direction that is a multiple of an even number of wavelength λ1, the second optical path difference providing structure provides a phase change with an incident light flux with wavelength λ2, and does not provide a substantial phase change with incident light fluxes having respectively wavelength λ1 and wavelength λ3. In the meantime, there is no restriction in providing step portion S shown in FIG. 3 on the second optical path difference providing structure 20.

Light-converging element L2 has optical surface S3 (incident surface) on the semiconductor laser light source side and optical surface S4 (emitting surface) on the optical disc each of which is in a form of an aspheric surface. The surfaces are designed such that a light flux with wavelength λ1 having been transmitted through aberration correction element L1 forms an excellent light-converged spot on information recording surface RL1; that a diffracted light with a diffraction order number providing the highest diffraction efficiency among diffracted lights generated by the phase change provided when a light flux with wavelength λ2 passes through second optical path difference providing structure 20, forms an excellent light-converged spot on information recording surface RL2 of DVD; and that a first order diffracted light with wavelength λ3 forms an excellent light-converged spot on information recording surface RL3 of CD.

In the present embodiment, objective optical element OBJ is made to be of a two-group structure that is composed of aberration correction element L1 and light-converging element L2. Owing to this, each of diffracting power and refracting power can be assigned to two optical elements, and a degree of freedom for design can be improved, which is an advantageous point. Alternatively, it is also possible to constitute objective optical element OBJ with a single lens, and to provide the first and second optical path difference providing structures and a diffractive structure on an incident surface and an emitting surface of the single lens, without being limited to the foregoing.

Further, if a diffractive structure, first optical path difference providing structure 10 and second optical path difference providing structure 20 are provided on the aberration correction element L1, it is not necessary to provide an optical path difference providing structure and a diffractive structure on the light-converging element L2. Therefore, it is possible to manufacture the light-converging element L2 easily even when the element is a glass lens, and to provide the objective optical element wherein generation of aberration caused by temperature changes can be controlled.

It is also possible to cause the objective optical element to have an aperture regulating function, by mounting a dichroic filter and a liquid crystal phase control element on the optical element that constitutes the objective optical element OBJ. Incidentally, though an illustration will be omitted here, it is possible to obtain an optical information recording and reproducing device capable of conducting at least one of recording of optical information on an optical disc and reproducing of information recorded on an optical disc, by mounting optical pickup device PU shown in the aforesaid embodiment, a rotating drive device that supports an optical disc rotatably and a controller that controls driving of the aforesaid devices.

EXAMPLE 1

Next, an example will be explained. In the present example, objective optical element OBJ is composed of two groups including aberration correction element L1 and light-converging element L2, each of incident surface S1 (first surface) and emitting surface S2 (second surface) of aberration correction element L1 is composed of a flat surface, and each of incident surface S3 (third surface) and emitting surface S4 (fourth surface) of light-converging element L2 is composed of an aspheric surface.

First optical path difference providing structure 10 is formed on incident surface S1 of aberration correction element L1, and second optical path difference providing structure 20 is formed on emitting surface S2 of aberration correction element L1. Lens data are shown in Table 1. Ri in Table 1 represents a radius of curvature, di represents a position in the optical axis direction for $i^{th}$ surface to $(i+1)^{th}$ surface and ni represents a refractive index of each surface. From now on (including the lens data in the Table), an exponent for 10 (for example, $2.5 \times 10^{-3}$) is expressed by E (for example, 2.5×E-3).

in the direction parallel with an optical axis), y represents a distance from the optical axis, R represents a radius of curvature, K represent a conic constant and $A_4, A_6, A_8, A_{10}, A_{12}, A_{14}, A_{16}, A_{18}$ and $A_{20}$ represent aspheric surface coefficients.

An optical path length given to a light flux having each wavelength by the optical path difference providing structure is stipulated by the numerical expression in which a coefficient shown in Table 1 is substituted for the optical path difference function in the expression of Numeral 2.

$$\phi = dor \times \lambda/\lambda_B \times (B_2 y^2 + B_4 y^4 + B_6 y^6 + B_8 y^8 + B_{10} y^{10})$$ [Numeral 2]

In the expression, $\phi$ represents an optical path difference function, $\lambda$ represents a wavelength of a light flux entering a diffractive structure, $\lambda_B$ represents a blaze wavelength, dor represents a diffraction order number of diffracted light used for recording and/or reproducing for an optical disc, y represents a distance from an optical axis and $B_2, B_4, B_6, B_8$ and $B_{10}$ represent coefficients of optical path difference function.

TABLE 1

[Specifications]
Focal length (405 nm) = 2.20 mm, magnification (405 nm) = 0,
entrance pupil diameter (405 nm) = 3.74 mm
Focal length (655 nm) = 2.30 mm, magnification (655 nm) = 0,
entrance pupil diameter (655 nm) = 2.94 mm
Focal length (785 nm) = 2.40 mm, magnification (785 nm) = 0,
entrance pupil diameter (785 nm) = 2.34 mm

[Paraxial data]

| Surface No. | r(mm) | d(mm) | n405 | n655 | n785 | nd | vd | Remarks |
|---|---|---|---|---|---|---|---|---|
| OBJ | | ∞ | | | | | | Light-emitting point |
| 1 | ∞ | 0.7000 | 1.514002 | 1.497499 | 1.494206 | 1.500000 | 60.0 | Aberration correction element L1 |
| 2 | ∞ | 0.1000 | | | | | | |
| 3 | 1.50977 | 2.5900 | 1.605256 | 1.586235 | 1.582389 | 1.589127 | 61.3 | Light-emitting element L2 |
| 4 | -3.98705 | d4 | | | | | | |
| 5 | ∞ | d5 | 1.622304 | 1.579954 | 1.573263 | 1.585459 | 30.0 | Protective layer |
| 6 | ∞ | | | | | | | |

[Aspheric surface coefficient]

| | Third surface | Fourth surface |
|---|---|---|
| κ | -0.660911 | -70.33824 |
| A4 | 0.79413E-02 | 0.99127E-01 |
| A6 | 0.86416E-04 | -0.10873E+00 |
| A8 | 0.20333E-02 | 0.80514E-01 |
| A10 | -0.12698E-02 | -0.40782E-01 |
| A12 | 0.28538E-03 | 0.11632E-01 |
| A14 | 0.21720E-03 | -0.13968E-02 |
| A16 | -0.16847E-03 | 0.00000E+00 |
| A18 | 0.45032E-04 | 0.00000E+00 |
| A20 | -0.44433E-05 | 0.00000E+00 |

[Optical path difference function coefficient]

| | First surface | Second surface |
|---|---|---|
| dor405/dor655/dor785 | 0/0/+1 | 0/+1/0 |
| λB | 785 nm | 655 nm |
| B2 | 2.2000E-02 | 5.0000E-03 |
| B4 | -1.0802E-03 | -7.6332E-04 |
| B6 | 2.7685E-04 | -1.8430E-04 |
| B8 | -5.6169E-05 | 3.1885E-06 |
| B10 | -1.3823E-05 | -7.6428E-06 |

$d4_{405}$ = 0.7150, $d4_{655}$ = 0.5056, $d4_{785}$ = 0.3170, $d5_{405}$ = 0.1000, $d5_{655}$ = 0.6000, $d5_{785}$ = 1.2000

An incident surface (third surface) and an emitting surface (fourth surface) of a light-converging element are formed to be aspheric surfaces which are axially symmetric about an optical axis which are stipulated by the numerical expression in which a coefficient shown in Table 1 is substituted in the expression of Numeral 1.

$$z = (y^2/R)/[1 + \sqrt{\{1-(k+1)(y/R)^2\}}] + A_4 y^4 + A_6 y^6 + A_8 y^8 + A_{10} y^{10} + A_{12} y^{12} + A_{14} y^{14} + A_{16} y^{16} + A_{18} y^{18} + A_{20} y^{20}$$ [Numeral 1]

In the expression, z represents aspheric surface form (distance from a plane tangential to the aspheric surface at its apex In the present example, it is assumed that step portion S shown in FIG. 2 is formed on the first optical path difference providing structure 10 formed on incidence surface S1 of aberration correction element L1 shown with lens data in Table 1.

In this case, a height (step difference) of step portion S is 80 nm, and it is smaller than a height (step difference) of a ring-shaped zone structure that forms the first optical path difference providing structure 10. Further, ratio B/A of a step portion to a width of a ring-shaped zone is 0.5.

By providing step portion S, diffraction efficiency of $+1^{st}$ order diffracted light of a light flux with wavelength $\lambda 3$ becomes higher than that of any other diffracted lights, and this diffracted light makes it possible to conduct recording and/or reproducing of information properly for CD. In addition, diffraction efficiency of $0^{th}$ order diffracted light (transmitted light) for each of light fluxes respectively with wavelengths $\lambda 1$ and $\lambda 2$ becomes higher than that of other diffracted lights, and these $0^{th}$ order diffracted lights make it possible to conduct recording and/or reproducing of information properly for a high density optical disc and DVD.

INDUSTRIAL APPLICABILITY

The present invention makes it possible to provide an objective optical element for an optical pickup device, an optical element for an optical pickup device, an objective optical element unit for an optical pickup device and an optical pickup device, which can conduct spherical aberration correction properly even when light fluxes having respectively plural different wavelengths enter.

The invention claimed is:

1. An objective optical element for use in an optical pickup device for recording and/or reproducing information on a first optical information recording medium having a protective layer with a thickness t1 by converging a light flux with a wavelength $\lambda 1$ through an objective optical element onto an information recording surface of the first optical information recording medium when information is recorded and/or reproduced on the first optical information recording medium, and for recording and/or reproducing information on a third optical information recording medium having a protective layer with a thickness t3 (t1<t3) by converging a light flux with a wavelength $\lambda 3$ ($\lambda 1<\lambda 3$) through the objective optical element onto an information recording surface of the third optical information recording medium when information is recorded and/or reproduced on the third optical information recording medium, the objective optical element comprising:

a first optical path difference providing structure providing an optical path difference so as to provide a substantial phase change with the light flux with the wavelength $\lambda 3$ and not to provide a substantial phase change with the light flux with the wavelength $\lambda 1$, wherein the first optical path difference providing structure comprises a step portion comprising a step difference whose height in an optical axis direction is smaller than the wavelength $\lambda 1$.

2. The objective optical element of claim 1, wherein when the light flux with the wavelength $\lambda 3$ passes through the first optical path difference providing structure comprising the step portion, the first optical path difference providing structure generates at least n th order and −n th order diffracted light fluxes (where n is a natural number), and one of the n th order and −n th order diffracted light fluxes has a larger light amount than a light flux in any other diffraction order generated by the first optical path difference providing structure, and wherein when the light flux with the wavelength $\lambda 1$ passes through the first optical path difference providing structure comprising the step portion, the first optical path difference providing structure generates at least 0th order diffracted light flux, and the 0th order diffracted light flux has a larger light amount than a light flux in any other diffraction order generated by the first optical path difference providing structure.

3. The objective optical element of claim 1, wherein the first optical path difference providing structure comprises a plurality of ring-shaped zones each comprising a step difference whose height in the optical axis direction is larger than the wavelength $\lambda 1$ and each forming a ring shape whose center locates at an optical axis when viewed from the optical axis direction, and the step portion is formed in a ring shape arranged on an internal circumference side of each of the plurality of ring-shaped zones of the first optical path difference providing structure when viewed from the optical axis direction, or is formed in a ring shape arranged on an outer circumference side of each of the plurality of ring-shaped zones of the first optical path difference providing structure when viewed from the optical axis direction.

4. An objective optical element for use in an optical pickup device for recording and/or reproducing information on a first optical information recording medium having a protective layer with a thickness t1 by converging a light flux with a wavelength $\lambda 1$ through an objective optical element onto an information recording surface of the first optical information recording medium when information is recorded and/or reproduced on the first optical information recording medium, for recording and/or reproducing information on a second optical information recording medium having a protective layer with a thickness t2 (t1≦t2) by converging a light flux with a wavelength $\lambda 2$ ($\lambda 1<\lambda 2$) through the objective optical element onto an information recording surface of the second optical information recording medium when information is recorded and/or reproduced on the second optical information recording medium, and for recording and/or reproducing information on a third optical information recording medium having a protective layer with a thickness t3 (t2<t3) by converging a light flux with a wavelength $\lambda 3$ ($\lambda 2<\lambda 3$) through an objective optical element onto an information recording surface of the third optical information recording medium when information is recorded and/or reproduced on the third optical information recording medium, the objective optical element comprising:

a first optical path difference providing structure providing an optical path difference so as to provide a substantial phase change with the light flux with the wavelength $\lambda 3$ and not to provide a substantial phase change with each of the light flux with the wavelength $\lambda 1$ and the light flux with the wavelength $\lambda 2$, and a second optical path difference providing structure providing an optical path difference so as to provide a substantial phase change with the light flux with the wavelength $\lambda 2$ and not to provide a substantial phase change with each of the light flux with the wavelength $\lambda 1$ and the light flux with the wavelength $\lambda 3$, wherein at least one of the first optical path difference providing structure and the second optical path difference providing structure comprises a step portion comprising a step difference whose height in an optical axis direction is smaller than the wavelength $\lambda 1$.

5. The objective optical element of claim 4,
wherein when the light flux with the wavelength $\lambda 3$ passes through the at least one of the first optical path difference providing structure and the second optical path difference providing structure comprising the step portion, the at least one of the first optical path difference providing structure and the second optical path difference providing structure generates at least n th order and −n th order diffracted light fluxes (where n is a natural number), and
one of the n th order and −n th order diffracted light fluxes has a larger light amount than a light flux in any other diffraction order generated by the at least one of the first optical path difference providing structure and the second optical path difference providing structure,
wherein when the light flux with the wavelength $\lambda 1$ or $\lambda 2$ passes through the at least one of the first optical path difference providing structure and the second optical path difference providing structure comprising the step portion, the at least one of the first optical path difference providing structure and the second optical path difference providing structure, generates at least 0th order diffracted light flux, and
the 0th order diffracted light flux has a larger light amount than a light flux in any other diffraction order generated by the at least one of the first optical path difference providing structure and the second optical path difference providing structure.

6. The objective optical element of claim 4,
wherein each of the first optical path difference providing structure and the second optical path difference providing structure comprises a plurality of ring-shaped zones each comprising a step difference whose height in an optical axis direction is larger than the wavelength $\lambda 1$ and each forming a ring shape whose center locates at the optical axis when viewed from the optical axis direction, and
wherein when the first optical path difference providing structure comprises the step portion comprising the step difference whose height in the optical axis direction is smaller than the wavelength $\lambda 1$, the step portion is formed in a ring shape arranged on an internal circumference side of each of the plurality of ring-shaped zones of the first optical path difference providing structure, or is formed in a ring shape arranged on an outer circumference side of each of the plurality of ring-shaped zones of the first optical path difference providing structure, and
when the second optical path difference providing structure comprises the step portion comprising the step difference whose height in the optical axis direction is smaller than the wavelength $\lambda 1$, the step portion is formed in a ring shape arranged on an internal circumference side of each of the plurality of ring-shaped zones of the second optical path difference providing structure, or is formed in a ring shape arranged on an outer circumference side of each of the plurality of ring-shaped zones of the second optical path difference providing structure.

7. The objective optical element of claim 4,
wherein the at least one of the first optical path difference providing structure and the second optical path difference providing structure comprising the step portion is one of a ring-shaped zone structure in a blaze-shape, a ring-shaped zone structure of a binary type, and a ring-shaped zone structure of an echelon type.

8. The objective optical element of claim 6,
wherein the step portion is arranged on each of the ring-shaped zones of the at least one of the first optical path difference providing structure and the second optical path difference providing structure comprising the step portion, and forms a ring shape whose center locates at an optical axis, and
the objective optical element satisfies a following expression when the ring-shaped zones of the at least one of the first optical path difference providing structure and the second optical path difference providing structure comprising the step portion have a width A perpendicular to the optical axis, and the step portion arranged on each of the ring-shaped zones has a width B perpendicular to the optical axis:

$0.1 \leq B/A 23\ 0.9$.

9. The objective optical element of claim 4,
wherein the at least one of the first optical path difference providing structure and the second optical path difference providing structure comprising the step portion, comprises a plurality of step portions whose height in the optical axis direction is smaller than the wavelength $\lambda 1$, and
the total height in the optical axis direction of the plurality of step portions is smaller than the wavelength $\lambda 1$.

10. An optical pickup device comprising the objective optical element of claim 4.

11. An optical element for use in an optical pickup device, comprising:
an optical path difference providing structure comprising a plurality of first ring-shaped zones each comprising a first step difference along an optical axis and each forming a ring shape whose center locates at an optical axis when viewed from an optical axis direction, the optical path difference providing structure providing a phase difference between neighboring first ring-shaped zones in the plurality of ring-shaped zones with a light flux with a predetermined wavelength emitted from a light source mounted in the optical pickup device; and
a step portion extending along each of the plurality of first ring-shaped zones,
wherein the step portion locally reduces a phase difference generated with the first step difference between the neighboring first ring-shaped zones, in the light flux with the predetermined wavelength passing through the first step difference of the plurality of first ring-shaped zones.

12. An optical element for use in an optical pickup device, comprising:
an optical path difference providing structure comprising a plurality of first ring-shaped zones each comprising a first step difference along an optical axis and each having a ring shape whose center locates at the optical axis when viewed from an optical axis direction, the optical path difference providing structure providing a phase difference between neighboring first ring-shaped zones among the plurality of ring-shaped zones with a light flux with a predetermined wavelength emitted from a light source mounted in the optical pickup device; and
a step portion comprising a second step difference whose height in the optical axis direction is smaller than the first step difference, the step portion being formed in a ring shape arranged on an internal circumference side of each of the plurality of ring-shaped zones of the optical path difference providing structure when viewed from an optical axis direction, or is formed in a ring shape arranged on an outer circumference side of each of the plurality of ring-shaped zones of the optical path difference providing structure when viewed from the optical axis direction.

13. The optical element of claim 11,
wherein when the light flux with the predetermined wavelength passes through the optical path difference providing structure comprising the step portion, the optical path difference providing structure comprising the step portion generates at least n th order and −n th order diffracted light fluxes (where n is a natural number), and
one of the n th order and −n th order diffracted light fluxes has a larger light amount than a light flux in any other diffraction order generated by the optical path difference providing structure.

14. An objective optical element unit for use in an optical pickup device, comprising:
the optical element of claim 11;
a light converging optical element; and
a lens frame in which the optical element and the light converging optical element are fixed.

15. An optical pickup device comprising:
the optical element of claim 11.

16. The objective optical element of claim 1,
wherein the first optical path difference providing structure comprising the step portion is one of a ring-shaped zone structure in a blaze shape, a ring-shaped zone structure of a binary type, and a ring-shaped zone structure of an echelon type.

17. The objective optical element of claim 3,
wherein the step portion is arranged on each of the ring-shaped zones of the first optical path difference providing structure comprising the step portion and forms a ring shape whose center locates at an optical axis, and
the objective optical element satisfies a following expression when the ring-shaped zones of the first optical path difference providing structure comprising the step portion have a width A perpendicular to the optical axis, and the step portion arranged on each of the ring-shaped zones has a width B perpendicular to the optical axis:

$$0.1 \leq B/A \leq 0.9.$$

18. The objective optical element of claim 1,
wherein the first optical path difference providing structure comprising the step portion comprises a plurality of step portions whose height in the optical axis direction is smaller than the wavelength $\lambda 1$, and
the total height in the optical axis direction of the plurality of step portions is smaller than the wavelength $\lambda 1$.

19. An optical pickup device comprising the objective optical element of claim 1.

20. The optical element of claim 12,
wherein, when the light flux with the predetermined wavelength passes through the optical path difference providing structure, the optical path difference providing structure comprising the step portion generates at least n th order and −n th order diffracted light fluxes (where n is a natural number), and
one of the n th order and −n th order diffracted light fluxes has a larger light amount than a light flux in any other diffraction order generated by the optical path difference providing structure.

21. An objective optical element unit for use in an optical pickup device, comprising:
the optical element of claim 12;
a light converging optical element; and
a lens frame in which the optical element and the light converging optical element are fixed.

22. An optical pickup device comprising the optical element of claim 12.

23. An optical pickup device comprising the objective optical element unit of claim 14.

* * * * *